United States Patent
Da Silva et al.

(10) Patent No.: US 11,291,068 B2
(45) Date of Patent: Mar. 29, 2022

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Icaro L. J. Da Silva, Solna (SE); Claes Tidestav, Bålsta (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 626 days.

(21) Appl. No.: 16/094,532

(22) PCT Filed: Aug. 6, 2018

(86) PCT No.: PCT/SE2018/050793
§ 371 (c)(1),
(2) Date: Oct. 18, 2018

(87) PCT Pub. No.: WO2019/032017
PCT Pub. Date: Feb. 14, 2019

(65) Prior Publication Data
US 2021/0185754 A1 Jun. 17, 2021

Related U.S. Application Data

(60) Provisional application No. 62/544,026, filed on Aug. 11, 2017.

(51) Int. Cl.
*H04W 76/19* (2018.01)
*H04L 5/00* (2006.01)
*H04W 48/20* (2009.01)

(52) U.S. Cl.
CPC .......... *H04W 76/19* (2018.02); *H04L 5/0048* (2013.01); *H04W 48/20* (2013.01)

(58) Field of Classification Search
CPC ..... H04W 16/28; H04W 16/30; H04W 16/32; H04W 52/0216; H04W 52/0219;
(Continued)

(56) References Cited

U.S. PATENT DOCUMENTS

2014/0323077 A1* 10/2014 Chandramouli ..... G08B 27/006
455/404.1
2016/0183233 A1* 6/2016 Park ..................... H04B 7/0408
370/331
(Continued)

OTHER PUBLICATIONS

International Search Report and Written Opinion of the International Searching Authority for International Application No. PCT/SE2018/050793 dated Oct. 24, 2018.
(Continued)

*Primary Examiner* — Jean A Gelin
(74) *Attorney, Agent, or Firm* — Christopher & Weisberg, P. A.

(57) ABSTRACT

According to embodiments herein a method performed by a radio network node for handling communication of a wireless device in a wireless communication network is herein provided. The radio network node configures the wireless device to perform a beam recovery process in one cell of a configured set of cells, wherein the configured set of cells includes a primary cell and a set of neighbor cells.

19 Claims, 10 Drawing Sheets

(58) Field of Classification Search
CPC ........... H04W 72/0413; H04W 72/042; H04W 72/046; H04W 76/19; H04W 76/28
See application file for complete search history.

(56) References Cited

U.S. PATENT DOCUMENTS

| | | | |
|---|---|---|---|
| 2018/0199226 A1* | 7/2018 | Tsai | H04W 24/10 |
| 2018/0206170 A1* | 7/2018 | Nagaraja | H04B 7/0408 |
| 2018/0279218 A1* | 9/2018 | Park | H04W 36/08 |
| 2018/0279358 A1* | 9/2018 | Babaei | H04W 72/0453 |
| 2019/0037498 A1* | 1/2019 | Tseng | H04W 52/0219 |
| 2019/0320355 A1* | 10/2019 | Da Silva | H04W 72/046 |
| 2019/0363809 A1* | 11/2019 | Yoon | H04B 17/318 |
| 2020/0022040 A1* | 1/2020 | Chen | H04W 36/0085 |
| 2020/0084089 A1* | 3/2020 | Da Silva | H04W 72/046 |
| 2020/0374960 A1* | 11/2020 | Deenoo | H04W 72/14 |
| 2021/0051502 A1* | 2/2021 | Yamada | H04L 5/0053 |

OTHER PUBLICATIONS

3GPP TR 38.912 V14.1.0, "3$^{rd}$ Generation Partnership Project; Technical Specification Group Radio Access Network; Study on New Radio (NR) access technology (Release 14)," Jun. 2017, 74 pages.

Intel, "Report of email discussion [98#32][NR] Measurement report content (Intel)," R2-1707013, 3GPP TSG-RAN WG2 #AdHoc Meeting, Qingdao, China, Jun. 27-29 2017, 23 pages.

Sony, "Fallback beam and RLF," R2-1701508 (resubmission of R2-1700144), 3GPP TSG RAN WG2 Meeting #97, Athens, Greece, Feb. 13-17, 2017, 2 gages.

Ericsson, "Beam management in NR," R2-1706949, 3GPP TSG RAN WG2 #AdHoc, Qingdao, China, Jun. 27-29, 2017, 4 gages.

Samsung, "UE triggering conditions of beam recovery," R2-1702002, 3GPP TSG RAN WG2 Meeting #97, Athens, Greece, Feb. 13-17, 2017, 4 pages.

Qualcomm Incorporated, "Delivery of System information," R2-1701813, 3GPP TSG RAN WG2 Meeting #97, Athens, Greece, Feb. 13-17, 2017, 4 pages.

Qualcomm Incorporated, "Beam recovery request," R2-1706926, 3GPP TSG RAN WG2 Meeting NR ad-hoc, Qingdao, China, Jun. 27-29, 2017, 3 pages.

Intel Corporation, "RAN2 implications from CSI-RS acquisition, beam managements and L3 mobility," R2-1707053, 3GPP TSG RAN NR AdHoc, Qingdao, China, Jun. 27-29, 2017, 4 pages.

Nokia et al., "Beam Recovery in NR," R2-1707198 (update of R2-1705442), 3GPP TSG RAN WG2 NR AdHoc #2, Qingdao, China, Jun. 27-29, 2017, 3 pages.

\* cited by examiner

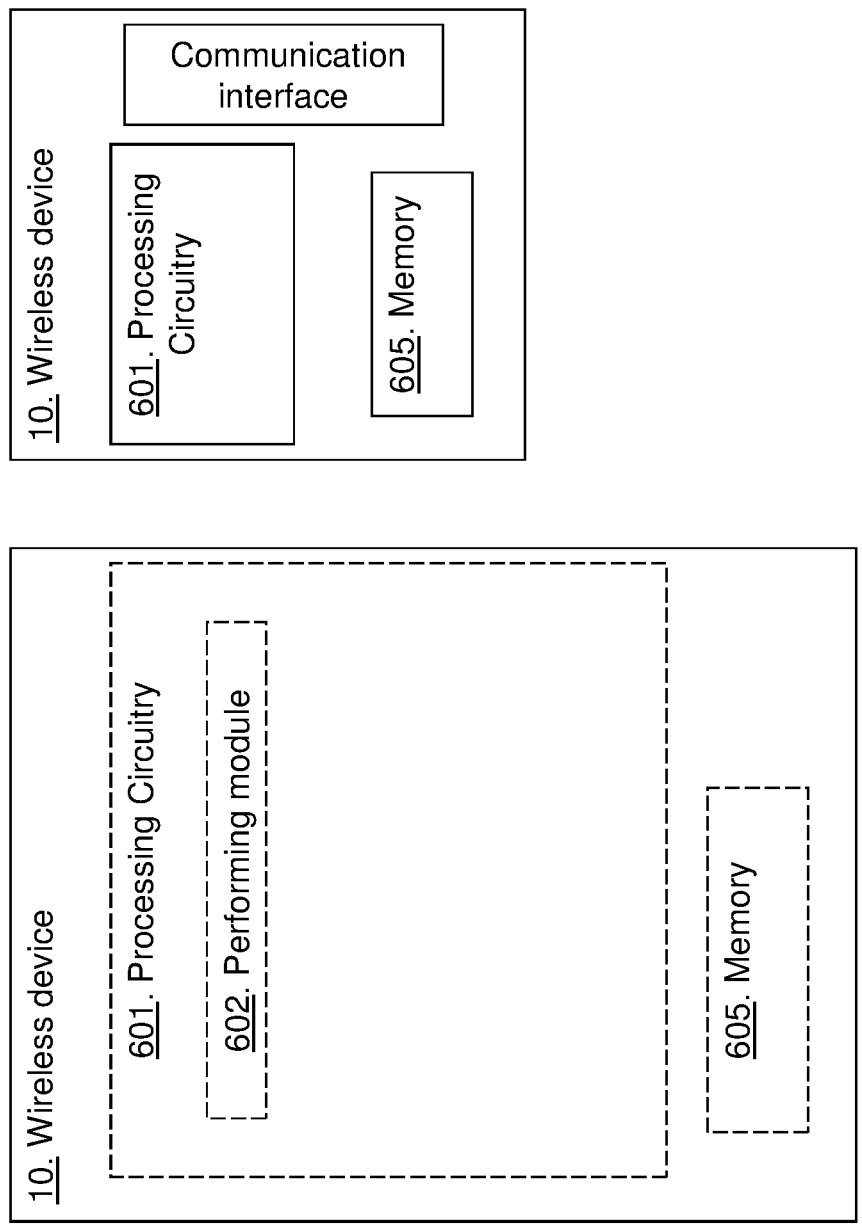
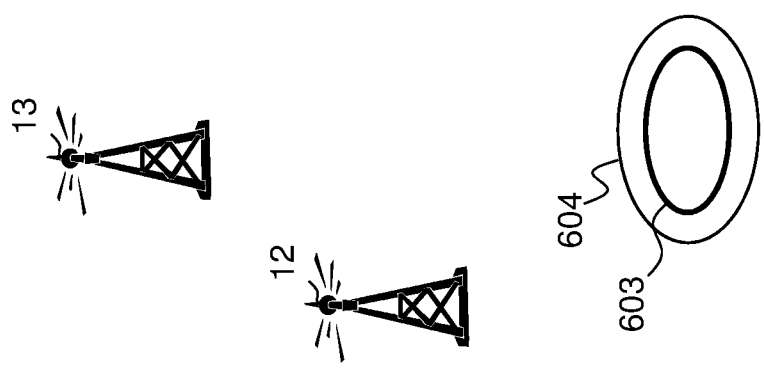
Fig. 6

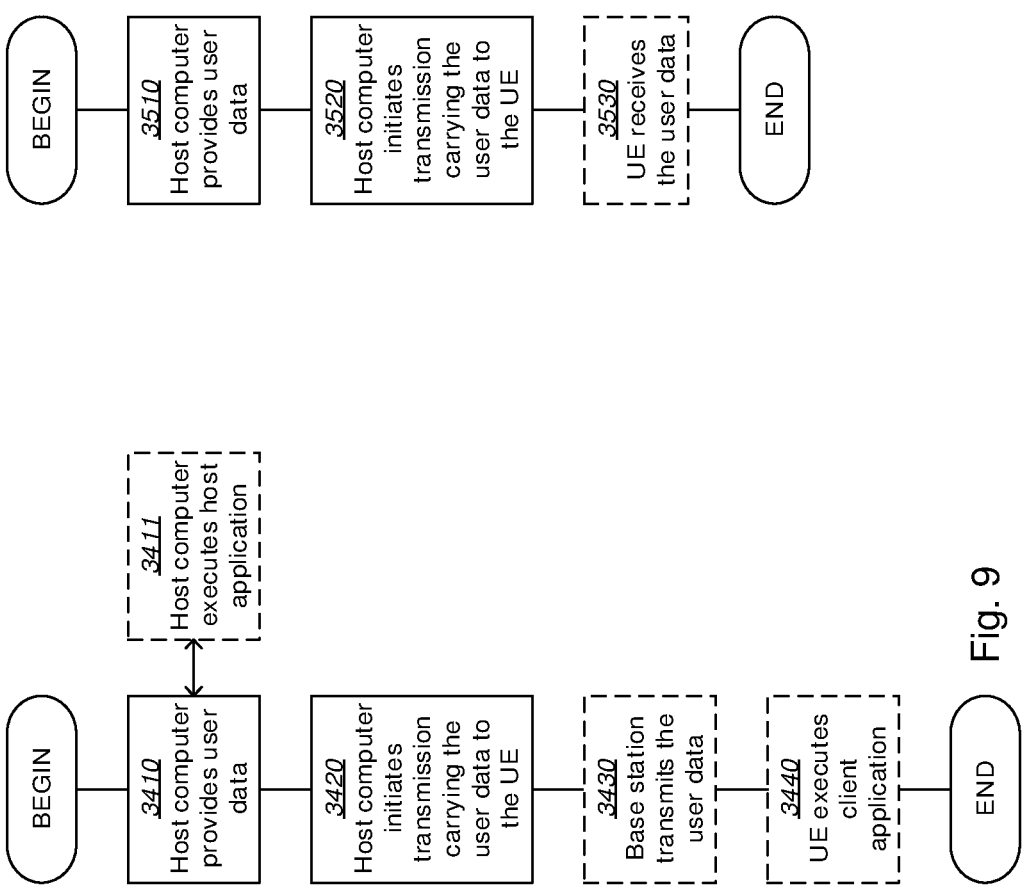

RADIO NETWORK NODE, WIRELESS DEVICE AND METHODS PERFORMED THEREIN

CROSS REFERENCE TO RELATED APPLICATIONS

This application is a 35 U.S.C. § 371 national stage application of PCT International Application No. PCT/SE2018/050793, filed on Aug. 6, 2018, which claims the benefit of U.S. Provisional Patent Application Ser. No. 62/544,026, filed on Aug. 11, 2017, the disclosures and content of which are incorporated by reference herein in their entireties.

TECHNICAL FIELD

Embodiments herein relate to a wireless device, a radio network node and methods performed therein for communication. Furthermore, a computer program product and a computer readable storage medium are also provided herein. In particular, embodiments herein relate to handling communication of a wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an enhanced NodeB (eNB) or a gNodeB. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), the members propose and agree upon standards for third generation networks, and investigate enhanced data rate and capacity. In some RANs, e.g. as in UTRAN, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN or LTE is a variant of a 3GPP radio access network wherein the radio network nodes are directly connected to the EPC core network rather than to RNCs. In general, in E-UTRAN or LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for the lack of RNCs, the E-UTRAN specification defines a direct interface between the radio network nodes, this interface being denoted the X2 interface.

In LTE, a wireless device of a Radio Resource Control (RRC) connected state i.e. having an active link to a radio network node such as an eNB, denoted as an RRC_CONNECTED wireless device, performs a function called Radio Link Monitoring (RLM) associated to its primary cell, e.g. primary cell (Pcell) or primary secondary cell (PSCell). That is done by performing measurements on reference signals such as cell specific reference signals (CRS) and comparing periodically to a quality threshold that maps to a Physical Downlink Control Channel (PDCCH) Block Error Rate (BLER). When the quality goes below that quality threshold the wireless device generates an out-of-sync (OOS) event. The radio network node configures a value N310, wherein N310 is the threshold for the number of out-of sync events to start a T310 timer. Thus, when the number of OOS events goes beyond N310, the wireless device starts the timer T310. When T310 expires, the wireless device declares radio link failure (RLF) and initiates an RRC connection reestablishment procedure.

When RLF is triggered the wireless device performs cell reselection and may re-select to the same cell or not. If the wireless device reselects a different cell, that cell may belong to the same or to a different radio network node. Irrespective if it is the same or different cell, same or different radio network node, the cell reselection behavior after the expiration of T310 is similar.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

In NR, a procedure called beam recovery is being defined. In beam recovery, an RRC_CONNECTED wireless device performs measurements associated to the quality of the serving link and, if that quality goes below a given threshold, the wireless device would perform beam recovery. The procedure aims to solve the situation where the Transmission (TX) and Reception (RX) beams of the radio network node, such as an gNodeB, and the wireless device have become misaligned, but where there are additional beams that could be used to maintain the connection between the gNodeB and the wireless device.

The Beam Failure Recovery Procedure Includes the Following Aspects:

Beam failure detection: here the wireless device monitors a certain periodic reference signal (RS) to estimate the quality of the serving link. Once the quality of that link falls below a certain threshold, the wireless device initiates beam recovery.

New candidate beam identification. Once beam failure has been detected, the wireless device tries to identify a new beam that would provide adequate quality. The wireless device then searches for a specific RS, which is transmitted from the same node, but in different candidate beams. During this search procedure, the wireless device may also change its RX beam.

Beam failure recovery request transmission. Once a new candidate beam has been found, the wireless device transmits an uplink (UL) signal using certain UL resources. The radio network node is prepared to receive the UL signal in these UL resources, and can determine which candidate beam the wireless device selected based on the received UL signal.

When the radio network node has received the beam failure recovery request, the radio network node sends a Downlink (DL) response to indicate to the wireless device that it received the request, using the knowledge of the new beam.

The wireless device monitors for the response for the beam failure recovery request. Once the wireless device has successfully received the response, the beam recovery is complete.

In NR, a Few Options are being Discussed with Respect to the Periodic RS the Wireless Device Monitors to Estimate the Quality of the Serving Link:

The radio network node can configure the wireless device to perform beam monitoring based on signals transmitted in the so-called Synchronization Signal (SS) Block, which is a cell-specific signal. The signals used that can be in the SS block are the New Radio—Primary synchronization signal (NR-PSS) and/or New Radio—Secondary synchronization signal (NR-SSS) and/or Demodulation Reference signal (DMRS) for Physical Broadcast Channel (PBCH).

The radio network node may also configure the wireless device to perform beam monitoring based on the channel state information-reference signal (CSI-RS).

The same options are being discussed as the reference signal used for candidate beam identification. At least for CSI-RS, different configurations may be used for the two purposes.

One candidate for the UL signal used for the beam failure recovery request is physical random access channel (PRACH), the same type of signal used during initial access, handover, state transitions, etc. To transmit using the PRACH, the wireless device selects one sequence out of the available PRACH sequences. Hence, the PRACH does not carry any payload. The information is conveyed by choosing different preambles. During initial access, the wireless device randomly chooses one PRACH sequence from a large set of available PRACH sequences. In other cases, e.g., during handover, the wireless device may choose a PRACH sequence from a set with only one element.

In e.g. NR, a split architecture has been agreed where multiple cells can be associated to a same Digital Unit (DU). Hence, a wireless device coming from RLF may re-select a cell that belongs to the same DU or to a different DU and perform RRC re-establishment associated to it. In other words, one could say that re-selection can occur toward cell from the same or from different radio network nodes.

If we follow the LTE approach, the wireless device would perform the same actions regardless if the cell is from the same or from different DU's. In other words, the wireless device would read system information, perform random access, and generate RRC signaling for the re-establishment procedure. The radio network node would then perform context fetching and continue the re-establishment. Avoiding RLF is beneficial from a network Key Performance Indicator (KPI) perspective and, hence, optimizations related to RLF actions if cell reselection occurs for same DU's have not yet been discussed in NR.

Furthermore, the beam recovery procedure is currently limited to the same cell: i.e. the new candidate beam must be in the same cell. Due to this limitation, beam recovery can only prevent RLFs if the new candidate beam is within the current cell. This may lead to a reduced or limited performance of the wireless communication network.

SUMMARY

An object of embodiments herein is to provide a mechanism for improving performance of the wireless communication network in an efficient manner.

According to an aspect the object is achieved by providing a method performed by a wireless device for handling communication of the wireless device in a wireless communication network. The wireless device performs a beam recovery process of a selected beam upon beam failure detection, wherein the selected beam is associated to one cell of a configured set of cells, which includes a primary cell and a set of neighbor cells.

According to another aspect the object is achieved by providing a method performed by a radio network node for handling communication of a wireless device in a wireless communication network. The radio network node configures the wireless device to perform a beam recovery process in one cell of a configured set of cells, which includes a primary cell and a set of neighbor cells.

According to yet another aspect the object is achieved by providing a radio network node and a wireless device configured to perform the methods herein.

It is furthermore provided herein a computer program product comprising instructions, which, when executed on at least one processor, cause the at least one processor to carry out any of the methods above, as performed by the radio network node or the wireless device. It is additionally provided herein a computer-readable storage medium, having stored thereon a computer program product comprising instructions which, when executed on at least one processor, cause the at least one processor to carry out the method according to any of the methods above, as performed by the radio network node or the wireless device.

Embodiments herein enable the network configuring a wireless device e.g. an RRC_CONNECTED wireless device, to perform beam recovery procedure in one cell out of a configured set of cells, which includes a primary cell and a set of neighbor cells, which may include, e.g., configured secondary cells (SCell).

The wireless device, e.g. based on received configuration data, performs beam selection upon beam failure detection (and/or RLF followed up by cell reselection) wherein the selected beam may be associated to the primary cell or configured neighbor cells. The wireless device may, based on received configuration data, after performing beam selection, send a configured UL message, e.g. preamble, associated to the selected beam, that may belong to the primary cell or any of the cells in the configured set of cells.

Embodiments herein reduce RLF by performing the beam recovery procedure in cells other than the serving cell. In the case of beam recovery after RLF, the procedure aims to speed up the RRC Connection Re-establishment already configured to be used for beam recovery and thus performance of the wireless communication network is improved in an efficient manner.

BRIEF DESCRIPTION OF THE DRAWINGS

Embodiments Will Now be Described in More Detail in Relation to the Enclosed Drawings, in which:

FIG. 6 is a block diagram depicting a wireless device according to embodiments herein;

FIGS. 9-12 are flowcharts illustrating methods implemented in a communication system including a host computer, a base station and a user equipment.

DETAILED DESCRIPTION

Figure 1:
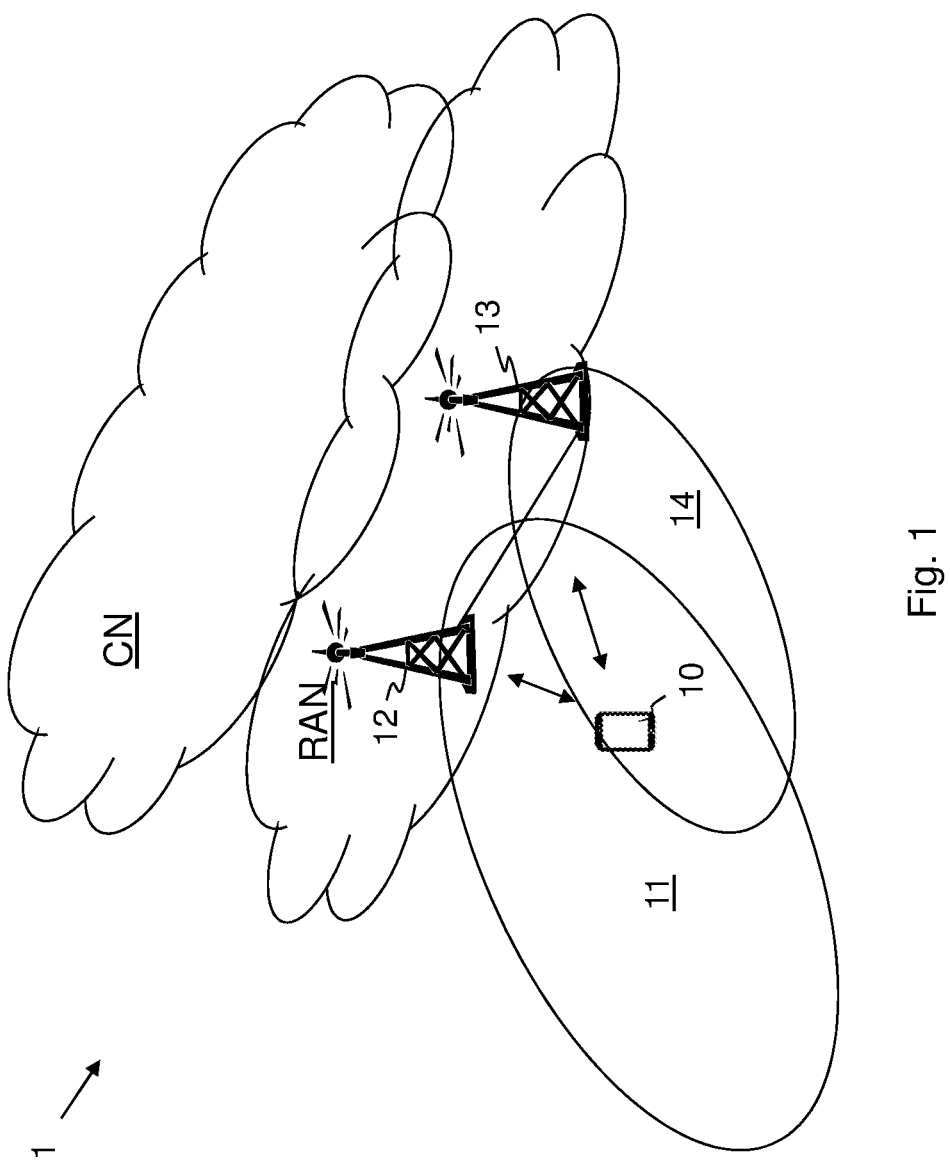
FIG. 1 is a schematic overview depicting a wireless communication network according to embodiments herein.

Embodiments herein relate to communication networks in general. FIG. 1 is a schematic overview depicting a wireless communication network 1. The communication network 1 comprises one or more RANs e.g. a first RAN (RAN1), connected to one or more CNs. The communication network 1 may use one or a number of different technologies, such as Wi-Fi, Long Term Evolution (LTE), LTE-Advanced, New Radio (NR), Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments are applicable to 5G and also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a first radio network node 12. The first radio network node 12 is exemplified herein as a RAN node providing radio coverage over a geographical area, a service area 11, of a radio access technology (RAT), such as NR, LTE, UTRA, Wi-Fi or similar. The first radio network node 12 is herein also denoted as the radio network node and may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a wireless device within the service area served by the first radio network node 12 depending e.g. on the radio access technology and terminology used and may be denoted as a scheduling node, serving radio network node or primary serving radio network node providing a primary serving cell for the wireless device 10.

The wireless communication network 1 further comprises a second radio network node 13. The second radio network node 13 is exemplified herein as a RAN node providing radio coverage over a geographical area, a second service area 14, of a radio access technology (RAT), such as NR, LTE, UTRA, Wi-Fi or similar. The second radio network node 13 may be denoted as a secondary node, secondary serving radio network node providing a secondary serving cell for the wireless device 10. It should be noted that a service area may be denoted as 'cell', beam, beam group or similar to define an area of radio coverage. The radio network nodes transmit RSs over respective service area in beams. Hence, the first and second radio network nodes may transmit CSI-RSs or beam reference signals (BRS), repeatedly, in time, in a large number of different directions using as many transmit beams as deemed necessary to cover the service area of the respective radio network node. Hence the radio network node 12 provides radio coverage over the first service area using a first reference signal, e.g. first CSI-RS, for the first service area 11 in the wireless communication network 1. The second radio network node 13 provides radio coverage over the second service area 14 using a number of beams each with a reference signal, e.g. one or more second CSI-RSs, in the wireless communication network.

It should further be understood that the first and second service area may also be provided by a single radio network node such as the first radio network node 12 or the second radio network node 13.

According to embodiments herein the radio network node 12 may configure the wireless device 10, e.g. an RRC_CONNECTED wireless device, to perform beam recovery procedure in one of a configured set of cells, which set of cells includes a primary cell and a set of neighbor cells. A neighbor cell in the context of embodiments herein is any cell that is not a primary cell. Some of the neighbor cells may be, e.g., configured Secondary Cells (SCell). It should be noted that there are two types of primary cells in NR and LTE: the primary cell (PCell) in a primary cell group, and the primary secondary cell (PSCell) which is the primary cell in a secondary cell group, i.e., when dual connectivity is configured. The configured set of cells may thus include serving cell(s) and non-serving cells, wherein the primary cell is the serving cell and the neighbor cells are the non-serving cells.

Figure 2:
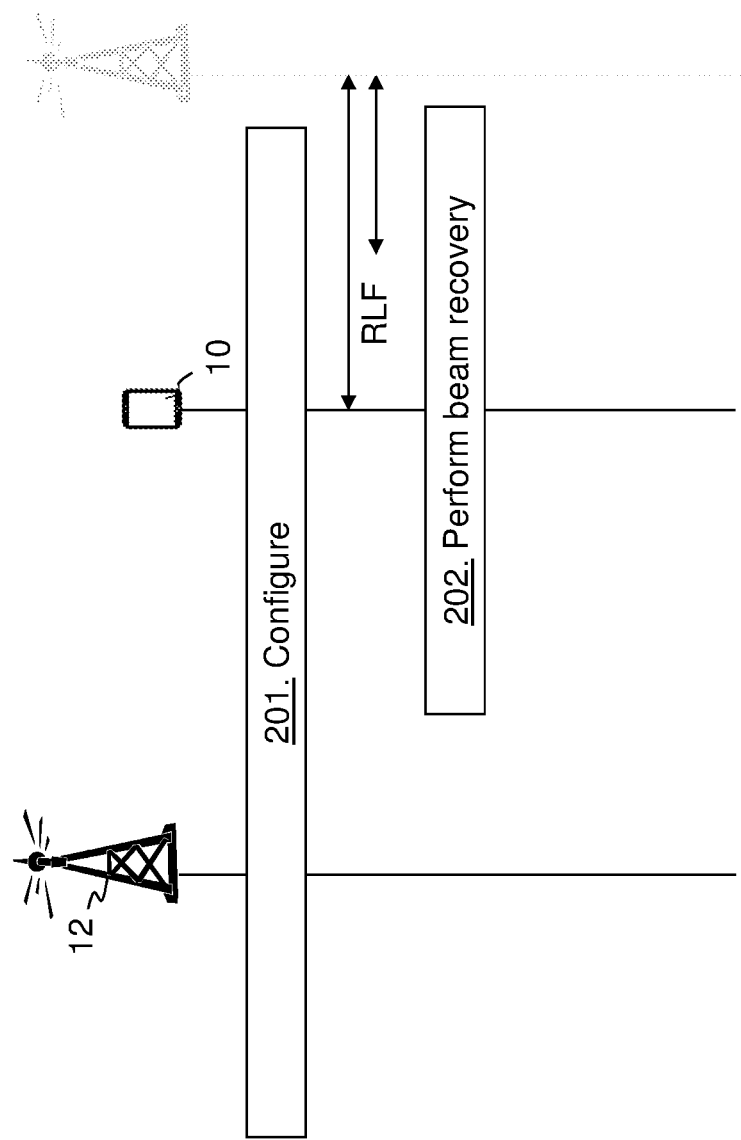
FIG. 2 is a flowchart depicting a combined signaling scheme and flowchart according to embodiments herein.

FIG. 2 is a combined signaling scheme according to embodiments herein.

Action 201. The radio network node 12 configures the wireless device 10 to perform a beam recovery process in one cell of a configured set of cells, which includes a primary cell, such as the Pcell in the primary cell group or a PSCell in the secondary cell group, and a set of neighbor cells.

Action 202. The wireless device 10 performs a beam recovery process of a selected beam upon beam failure detection, wherein the selected beam is associated to one cell of the configured set of cells, which set of cells includes the primary cell and the set of neighbor cells.

Figure 3:
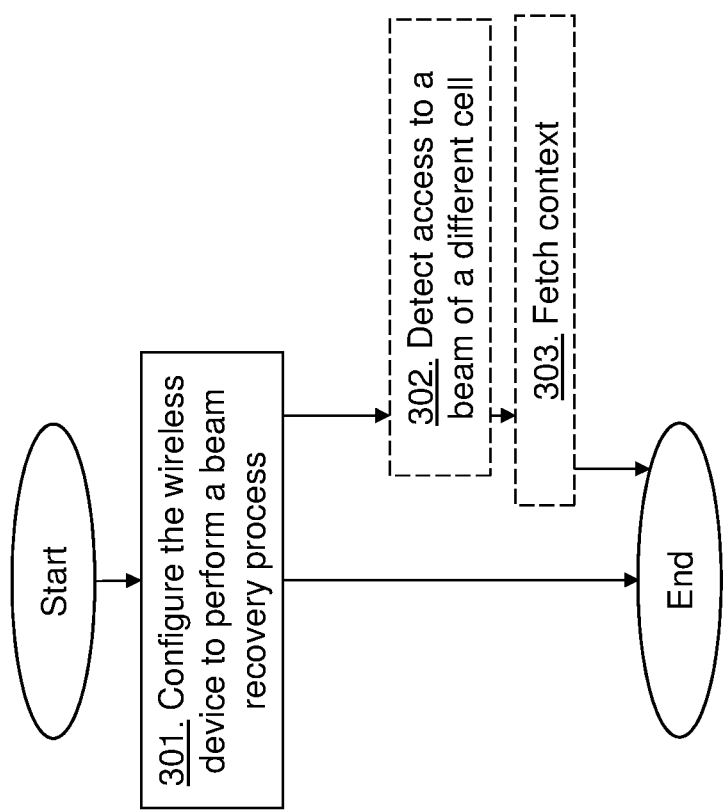
FIG. 3 is a flowchart depicting a method performed by a wireless device according to embodiments herein.

The method actions performed by the radio network node 12 for handling communication of the wireless device 10 in the wireless communication network 1 according to embodiments herein will now be described with reference to a flowchart depicted in FIG. 3. The actions do not have to be taken in the order stated below but may be taken in any suitable order. Actions performed in some embodiments are marked with dashed boxes. As stated above the primary cell may be a primary cell of a primary cell group or a primary secondary cell of a secondary cell group. A neighbor cell in the set of neighbor cells may be a non-serving cell or a serving cell that is a secondary cell.

Action 301. The radio network node 12 configures to wireless device 10 to perform a beam recovery process in one cell of a configured set of cells, wherein the configured set of cells includes a primary cell and a set of neighbor cells. The set of neighbor cells may be comprised in a list of cells of a same or different measurement object, e.g. carrier frequency, as the primary cell. The set of neighbor cells may be any cells of the same or different measurement object as the primary cell. The radio network node 12 may configure the wireless device 10 by transmitting a black list indicating cells where the wireless device 10 is not allowed to perform beam recovery process. The radio network node 12 may configure the wireless device 10 by transmitting reference signal configuration and/or uplink resource configuration per configured cell or for all cells in the set of cells. The radio network node 12 may configure the wireless device 10 by transmitting a threshold per cell defining when to select a cell of the set of neighbor cells relative the primary cell.

Action 302. The radio network node 12 may detect that the wireless device 10 accesses a beam of a different cell, which cell is not provided by the radio network node 12. I.e. the radio network node 12 may detect that the wireless device 10 has accessed another cell than the primary cell and may perform context fetching, if the cell does not belong to the same DU and/or the same radio network node e.g. gNodeB (network based procedure). Hence, if the cell of the selected beam is: the same as primary cell i.e. no change of serving node; different from the primary cell, but still in the same radio network node then no context fetching is needed; and different from the primary cell, and in a different radio network node context fetching may be performed.

Action 303. The radio network node 12 may, upon detection of the access to the different cell, fetch context of the wireless device 10. It should be noted that the radio network node may identify which cell the wireless device 10 access by partitioning beam recovery resources per cell where a subset is used for one cell and another is used for another neighbor cells. Resources can be reused across cells placed distant enough from each other.

Figure 4:
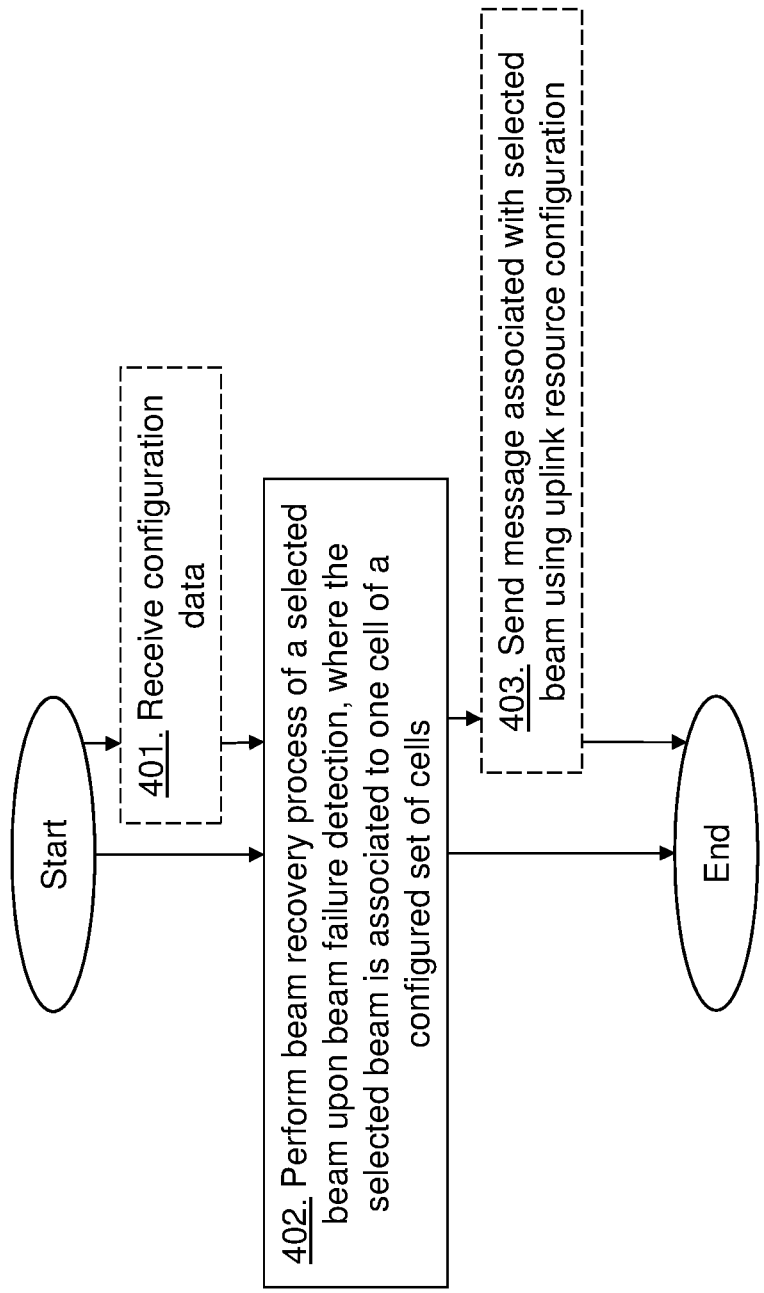
FIG. 4 is a flowchart depicting a method performed by a radio network node according to embodiments herein.

The method actions performed by the wireless device 10 for handling communication of the wireless device 10 in the wireless communication network 1 according to embodiments herein will now be described with reference to a flowchart depicted in FIG. 4. The actions do not have to be taken in the order stated below but may be taken in any suitable order. Actions performed in some embodiments are marked with dashed boxes.

Action 401. The wireless device 10 may receive configuring data from the radio network node configuring the wireless device with the set of cells. The configuring data may comprise the black list indicating cells where the wireless devices 10 is not allowed to perform beam recovery process. The configuring data may comprise the reference signal configuration and/or uplink resource configuration per configured cell or for all cells in the set of cells. The configuring data may comprise a threshold per cell defining when to select a cell of the set of neighbor cells relative the primary cell.

Action 402. The wireless device 10 performs the beam recovery process of a selected beam upon beam failure detection, wherein the selected beam is associated to one cell of a configured set of cells, wherein the configured set of cells includes a primary cell and a set of neighbor cells. Alternatively one could state that the wireless device 10 selects a beam upon beam failure detection wherein the selected beam is associated to one cell of the configured set of cells. The wireless device may select a beam based on the received configuration data.

Action 403. The wireless device 10 may send a message associated with the selected beam using an uplink resource configuration that belongs to the primary cell or any of the configured set of cells, i.e. sending the message according to the uplink resource configuration.

As shown above the radio network node 12 configures the wireless device 10 with a set of neighbor cells—These neighbor cells may be associated to a same measurement object, e.g. same carrier frequency or frequency location, as the primary cell or to a different measurement object than the one associated to the primary cell. Frequency location meaning frequency position e.g. provided with an absolute radio-frequency channel number (ARFCN) or a frequency offset. In NR, that is provided with an ARFCN of a synchronization signal block (SSB) location. This is where the UE should search for a cell Same Measurement Object e.g. Same Carrier Frequency:
  In one option, a cell list, e.g. a beamRecoveryCellList, associated to the same measurement object as the primary cell can be configured as candidates for beam recovery. I.e. upon beam failure in the primary cell, the wireless device 10 can perform beam selection with a neighbor cell on the same carrier frequency and/or the same frequency location as the primary cell.
  In another option, all cells associated to the same measurement object as the primary cell can be candidates for beam recovery. I.e. upon beam failure in the primary cell, the wireless device 10 can perform beam selection with any neighbor cell on the same carrier frequency and/or the same frequency location as the primary cell
  In another option, all cells associated to the same measurement object as the primary cell except black listed cells for beam recovery can be candidates for beam recovery. These black listed cells can be the same ones configured for measurement report triggering purposes i.e. non-applicable cells for triggering events e.g. A1-A6. That can also be another black list. In other words, upon beam failure in the primary cell, the wireless device 10 may perform beam selection with any neighbor cell of the same carrier frequency and/or the same frequency location as the primary cell except the ones provided in the black list.

Different Measurement Objects e.g. Different Carrier Frequencies:
   In one option, a cell list, e.g. a beamRecoveryCellList, not necessarily associated to the same measurement object as the primary cell, can be configured as candidates for beam recovery. I.e. upon beam failure in the primary cell, the wireless device 10 can perform beam selection with a neighbor cell that may be on a different carrier frequency and/or in a different frequency location than the primary cell. That can be used in the case where there is no need to configure measurement gaps for beam selection upon beam failure triggering i.e. RSs from the different cells are transmitted in frequency locations within the wireless device minimum's bandwidth so that the wireless device 10 does not need frequency retuning to perform inter-frequency measurements.
   In another option, all cells associated to a set of configured measurement objects can be candidates for beam recovery. I.e. upon beam failure in the primary cell, the wireless device 10 can perform beam selection with any neighbor cell of any of the configured list of measurement objects i.e. any configured carrier frequency and/or any frequency location.

The configuration data to the wireless device 10 may include one or a combination of the following beam failure monitoring configuration(s).
   In one option the radio network node 12 can configure the wireless device 10 to monitor beam failure based on a reference signal transmitted in the so-called SS Block, which is a cell-specific signal. That RS can be the NR-PSS and/or NR-SSS and/or DMRS for PBCH. In the case, all the options are possible, the radio network node 12 can configure which exact signal shall be monitored. When it comes to the cell association, in that case, the wireless device 10 can be configured to monitor at least that RS associated to the PCell and trigger beam recovery based on that one.
   In another option the radio network node 12 can configure the wireless device 10 to monitor beam failure, i.e. the trigger for beam recovery, based on a wireless device-specific reference signal(s) such as CSI-RS(s), which can be associated to different beams of the PCell.
   In yet another option the radio network node 12 can configure both RSs, and configure a triggering function based on the quality of both RSs at the same time e.g. quality of SS below a threshold AND quality of CSI-RS below another or the same threshold. That could be useful if radio network node wants to trigger recovery based on the degradation in quality of wide beams and narrow beams, possibly mapped to SS and CSI-RS qualities.

The configuration data may include one of the following configurations related to beam selection upon triggering of beam failure. That can be provided per configured cell, including the primary cell or configured neighbor cells:
   RS configuration(s) also denoted as RS type configurations:
      SS Block-based beam selection: In one option the radio network node 12 may configure the wireless device 10 to perform beam selection upon triggering of beam failure based on a reference signal transmitted in the so-called SS Block, which is a cell-specific signal. That RS can be the NR-PSS and/or NR-SSS and/or DMRS for PBCH. All the options are possible, the radio network node 12 may configure which exact signal shall be monitored. This may be useful if the network decides not to transmit CSI-RS(s) in that cell and for that wireless device 10 or in the case that CSI-RS is not transmitted to cover the whole cell.
      CSI-RS(s)-based beam selection: In another option the radio network node 12 may configure the wireless device 10 perform beam selection upon triggering of beam failure based on a wireless device-specific reference signal(s) such as CSI-RS(s), which can be associated to different beams of each cell. If CSI-RS is configured, the radio network node 12 can provide the wireless device 10 the resources with which the CSI-RS(s) are transmitted so the wireless device 10 can perform measurements to then perform the beam selection. Performing beam selection upon recovery based on CSI-RS may allow the wireless device 10 to directly inform the radio network node 12 which narrow beam is the best when a failure occurs, in a network where SS is transmitted with wide beamforming (or even in System Frame Number (SFN) or omni directional), and CSI-RS(s) are transmitted in narrow beams.
      SS Block and CSI-RS based beam selection: In another option the radio network node 12 may configure the wireless device 10 to perform beam selection upon triggering of beam failure based on either the SS Block as described above or based on a wireless device-specific reference signal(s) such as CSI-RS(s), which can be associated to different beams of each cell. If CSI-RS is configured, the radio network node may provide the wireless device 10 with the resources with which they are transmitted so the wireless device 10 can perform measurements to then perform the beam selection. A motivation to configure both could be that the wireless device 10 first tries to recover by searching for CSI-RS(s) and, if that fails, the wireless device 10 can try to perform recovery based on the SS-block, which can be seen as a fallback procedure to the CSI-RS based recovery. Notice that in some cases, the SS-based recovery is more likely to succeed since that can be transmitted in a wide beam and may always be on.
Level of Granularity:
Primary cell and neighbor cells: The wireless device 10 can be configured with one RS type for the primary cell and another for the neighbor cells. In other words, two RS configurations can be provided. Below we summarize all possible configurations in a table

| Summary of possible configurations in the case of RS type being configured for primary cell and neighbor cells | |
|---|---|
| RS type for beam selection of the primary cell | RS type for beam selection of all Neighbor cells |
| SS-block | SS-block |
| SS-block | CSI-RS |
| CSI-RS | SS-block |
| CSI-RS | CSI-RS |
| SS-block and CSI-RS | SS-block |
| SS-block and CSI-RS | CSI-RS |
| SS-block and CSI-RS | SS-block and CSI-RS |

Below it is shown an example of a single configuration data provided to the wireless device 10 by the radio network node 12. In that example, when beam failure is detected, SS-block based beam selection should be performed by the wireless device 10 both in primary and neighbor cells.

| RS type for beam selection of the PCell | RS type for beam selection of all Neighbor cells |
|---|---|
| SS-block | SS-block |

Cell-based: The wireless device 10 can be configured with the RS type per cell. In that case, the primary cell and each of the configured neighbor cells can have a different RS type. Below we show an example of a configuration for the case of 3 cells being configured. For the primary cell and one of the neighbor cells (e.g. the one where the serving has CSI-RS configuration), CSI-RS is used while SS Block based RS is used for the other neighbor cells.

| RS type for beam selection of the PCell | RS type for beam selection of Neighbor cell 1 | RS type for beam selection of Neighbor cell 2 | RS type for beam selection of Neighbor cell 3 |
|---|---|---|---|
| CSI-RS | CSI-RS | SS-block | SS-block |

Measurement object-based: In that case, the RS type for beam selection triggered by beam failure, during beam recovery, is configured per measurement object. Hence, for all cells associated to a given measurement object the same RS type parameter may be considered by the wireless device. If during selection the wireless device performs the selection within the same measurement object associated to the primary cell, the same RS type should be used.

Same as RS type defined for monitoring: In that case, a single RS configuration is provided for beam failure monitoring and beam selection when failure has been triggered.

The configuration data may include one of the following beam recovery signal configuration(s) for the primary cell and the configured neighbor cells. The wireless device may be provided with different beam recovery signal configurations for different cells. In one option, the radio network node 12 includes a common beam recovery signal configuration(s) associated to one or multiple neighbor cells. That common beam recovery signal configuration comprises an UL resource configuration e.g. a set of UL signals and UL channel configuration(s), such as time and/or frequency and/or sequence configuration, where the wireless device 10 should transmit an UL signal. If the wireless device 10 is configured to perform beam selection of beams from multiple neighbor cells, in addition to the primary cell, the radio network node 12 may provide multiple of these common beam recovery signal configuration(s), which can be possibly one per configured cell. In that UL resource configuration, there may be an association between the selected beam(s) of a given cell and the selection of one of the UL sequences and/or the resources where the wireless device 10 should transmit the sequence. As this is a "common" configuration, multiple wireless devices may receive the same UL resource configuration per cell i.e. the same set of possible UL signal(s) and UL channel configuration(s) to be chosen. There can be a partitioning on the network side of UL resource configurations per selected beam and, for a given cell, upon failure detection, the wireless device 10 selects a beam and, based on that, can select one of the possible UL resource configurations. Different wireless devices will likely select different UL resource configuration to randomize the occurrence of collision but there can be cases where two wireless devices can simultaneously select the same beam and perform beam recovery. That case should be handled as a contention resolution scheme. Alternatively, a single common beam recovery signal configuration(s), valid for multiple cells.

In one sub-option, that common beam recovery signal configuration(s) is the common RACH configuration associated to a given cell or a set of cells. In this case, the UL resource configuration may comprise a PRACH preamble sequence and the channel to transmit the PRACH preamble sequence may comprise RACH time/frequency resources. In that sub-option, the wireless device 10 may have multiple common RACH configurations (including PRACH configuration) associated to multiple cells. Below it is shown an example of the provided UL resource configurations per cell. Notice that for each beam that could be selected in each cell there can be multiple preambles. The wireless device 10 would randomly select one of them to avoid collision.

| Cells | Primary cell | Cell-1 | Cell-2 |
|---|---|---|---|
| Recovery configuration or UL resource configuration | Beam#1 → possible sequence set (p1, p2), T/F locations, etc. Beam#2 → possible sequence set (p3, p4), T/F locations, etc. ... Beam#64 → possible sequence set (p127, p128), T/F locations, etc. | Beam#1 → possible sequence set (p1', p2'), T/F locations, etc. Beam#2 → possible sequence set (p3', p4'), T/F locations, etc. ... Beam#16 → possible sequence set (p31', p32'), T/F locations, etc. | Beam#1 → possible sequence set (p1", p2"), T/F locations, etc. Beam#2 → possible sequence set (p3", p4"), T/F locations, etc. ... Beam#64 → possible sequence set (p127", p128"), T/F locations, etc. |

In another sub-option, that common beam recovery signal configuration(s) or UL resource configuration(s) is related to a new UL channel designed for beam recovery, associated to a given cell or a set of cells.

In another option, the radio network node 12 includes a dedicated beam recovery signal configuration(s) or UL resource configuration(s) associated to one or multiple neighbor cells. That configuration consists of one or a set of UL signals and UL channel configuration(s) possibly defined per cell.

In one sub-option, that dedicated beam recovery signal configuration(s) or UL resource configuration(s) is a dedicated RACH configuration associated to a given cell or a set of cells. In this case, each UL signal can be a PRACH preamble sequence and the channel to transmit that the RACH time/frequency resources. In that sub-option, the wireless device 10 may have one or multiple dedicated RACH configurations (including PRACH configuration) associated to multiple cells. Below it is shown an example of the provided or UL resource configuration(s) per cell. Notice that for each beam that could be selected in each cell there can be a single preamble per beam per wireless device 10 to avoid collision. Below it is shown an example where a single preamble is provided per cell per wireless device.

| Cells | PCell | Cell-1 | Cell-2 |
|---|---|---|---|
| Recovery configuration or UL resource configuration | Beam#1 → possible sequence set (p1), T/F locations, etc. Beam#2 → possible sequence | Beam#1 → possible sequence set (p1', p2'), T/F locations, etc. Beam#2 → possible sequence | Beam#1 → possible sequence set (p1", p2"), T/F locations, etc. Beam#2 → possible sequence |

-continued

| Cells | PCell | Cell-1 | Cell-2 |
|---|---|---|---|
| | set (p2), T/F locations, etc. | set (p3', p4'), T/F locations, etc. | set (p3", p4"), T/F locations, etc. |
| | ... | ... | ... |
| | Beam#64 → possible sequence set (p127), T/F locations, etc. | Beam#16 → possible sequence set (p31', p32'), T/F locations, etc. | Beam#64 → possible sequence set (p127", p128"), T/F locations, etc. |

In another sub-option, that dedicated beam recovery signal configuration(s) or UL resource configuration(s) is defined only for that particular purpose.

In another option, the radio network node 12 includes both common and dedicated beam recovery signal configuration(s) or UL resource configuration(s) associated to one or multiple neighbor cells where there can be common configurations for a subset of cells and dedicated for another subset of cells. As one possible example, radio network node 12 configures the wireless device 10 with dedicated configuration for the PCell and common configuration(s) for the neighbor cells. That allows a more efficient usage of resources for beam recovery and, in the case these are partitioning with RACH resources, a more efficient usage of RACH resources. This is shown below:

| Cells | PCell | Cell-1 | Cell-2 |
|---|---|---|---|
| Recovery configuration | Beam#1 → possible sequence set (p1), T/F locations, etc. | Beam#1 → possible sequence set (p1', p2'), T/F locations, etc. | Beam#1 → possible sequence set (p1", p2"), T/F locations, etc. |
| | Beam#2 → possible sequence set (p2), T/F locations, etc. | Beam#2 → possible sequence set (p3', p4'), T/F locations, etc. | Beam#2 → possible sequence set (p3", p4"), T/F locations, etc. |
| | ... | ... | ... |
| | Beam#64 → possible sequence set (p127), T/F locations, etc. | Beam#16 → possible sequence set (p31', p32'), T/F locations, etc. | Beam#64 → possible sequence set (p127", p128"), T/F locations, etc. |

Identifier of the wireless device 10 may be used in the case beam recovery is configured to be used with a contention based access scheme.

Multi-Cell Beam Selection

The wireless device 10, based on network configurations, performs beam selection upon beam failure detection where the selected beam is associated to the primary cell or configured neighbor cells. In the discussion, a best beam is the beam with best quality. When the radio network node 12 configures beam recovery parameters associated to the primary cell and one or multiple neighbor cells, as described above, beam selection upon beam failure may be performed in different manners.

In one option, the wireless device 10 always selects the best beam out of the beams from the primary cell or any of the configured neighbor cells.

In another option, the wireless device 10 selects the best beam from the primary cell, and, only if the best beam in another cell is better than the best beam of the primary cell e.g. with a relative threshold, the wireless device 10 selects a beam from another cell.

In yet another option, the wireless device 10 selects the best beam from the primary cell, and, only if the best beam in another best cell is better than the best beam of the primary cell, e.g., with a relative threshold, and if the number of detected beams is above a certain threshold, the wireless device 10 selects a beam from the other cell.

In yet another option, the wireless device 10 selects the best beam from the PCell and the best beam in the best neighbor cell. In that case, the wireless device 10 performs beam recovery with both cells and gets prepared to receive a response from either cells and/or both. In yet another option, the wireless device 10 may prioritize beams from the same measurement object as the primary cell, e.g. same carrier frequency, e.g. only select beams of non-serving cells if the beams in primary are really bad, like below a threshold or if the beams from non-serving cells are much better.

The beam selection abovementioned, where the selection may be associated to the primary cell or a cell of the set of neighbor cells, may occur upon beam failure detection while the wireless device 10 is in connected state, such as RRC_CONNECTED state. Another possibility is to perform beam selection and multi-cell beam recovery, i.e. select a beam from another cell, upon Radio Link Failure. In that case, e.g., after the RLF timer expires, the wireless device 10 may search for new cells and perform cell re-selection. If the wireless device 10 re-selects the primary cell or another cell from which the wireless device 10 has been configured to perform beam recovery, e.g. with dedicated resources, the wireless device 10 should perform beam recovery. If the wireless device 10 re-selects another cell that has not been configured, the wireless device 10 performs RRC Connection Re-establishment, resume or equivalent procedure.

It should be noted that the beam selection is a process where the wireless device 10 perform measurements on multiple beams and selects a beam based on some criteria as described above. Although it is herein described that the selection process occurs after the failure is detected, the wireless device 10 may already have performed per beam measurements including beams from the primary cell and from neighbor cells. Some of these beam level measurements may e.g. be ones used for the derivation of cell measurement results and/or for inclusion of beam level measurements to measurement reports. In that sense, the selection process may occur based on available measurements, based on measurements started when the failure is detected or a combinations of these measurements over time.

In some embodiments herein, the radio network node 12 detects that the wireless device 10 has accessed another cell than the primary cell and performs context fetching, if the cell does not belong to the same DU.

When beam recovery is configured for the primary cell and multiple neighbor cells, upon the detection of beam failure, the wireless device 10 may select a beam from the primary cell and/or from any of the configured neighbor cells, as described above. There can be different network actions between nodes and between the wireless device 10 and the network depending on the beam selected by the wireless device 10 and the UL signal transmitted by the wireless device 10.

Actions within the network node and/or between network nodes. Network nodes in this context can be Digital Units (DUs) where layer one (L1) and/or L1 and layer two (L1/L2) are implemented.

Even before the procedure is triggered by the wireless device 10, radio network nodes can coordinate the usage of these resources i.e. this set of cells need to exchange the following information:
Common and/or dedicated beam recovery information per configured cell;

Supported RS type (SS or CSI-RS) and resources where these are being transmitted.

After the procedure is triggered by the wireless device 10, the radio network node 12 receiving the UL signal can identify that this is about a wireless device trying to perform beam recovery, which cell has the wireless device 10 selected and which beam within the selected cell. After that, the radio network node 12 may prepare a DL response, e.g. a Random Access Response message.

How to identify this is beam recovery: radio network node 12 may do that by detecting the exact channel and/or exact UL signal. In the case random access procedure is used for beam recovery, resource partitioning can be used to distinguish the procedure triggered upon handovers and state transitions from beam recovery.

How to identify the exact cell the wireless device 10 is trying to access: The wireless device 10 may be configured to select a beam from multiple cells rather than just the primary cell. Hence, network should be able to identify that the wireless device 10 has selected a given cell. That can be done by partitioning the beam recovery resources per cell where a subset is used for one cell and another is used for another neighbor cells. Resources can be reused across cells placed distant enough from each other.

How to identify the exact wireless device: The wireless device is configured to select a beam from multiple cells rather than just the PCell. Hence, radio network node 12 may be able to identify the exact wireless device 10 regardless which of the configured cells the wireless device is trying to access.

In one alternative, that is possible thanks to the dedicated resources provided for that purpose i.e. network identifies the wireless device by detecting the UL signal, exact time/frequency resources.

In another alternative, that is possible thanks to a wireless device-specific higher layer identifier such as a Cell Radio Network Temporary Identifier (C-RNTI), resumeID and/or any wireless device identifier. In that case, the identifier can be used to perform contact fetching from one node to another.

When the radio network node 12 has identified the cell, the selected beam and the wireless device 10 trying to recover beam, the radio network node 12 may transmit a beam recovery request response.

The beam recovery response may be a random access response message whose configuration is per selected cell i.e. the cell related to the beam the UE has selected during beam recovery.

If the wireless device 10 has selected a beam from a primary cell, the radio network node 12 may configure a beam recovery response to be transmitted using a previously configured wireless device-specific DRMS over a previously configured channel such as PDCCH/PDSCH for the detected wireless device 10. If the wireless device 10 has selected a beam from a primary cell, in that case, it also expects a response transmitted in the wireless device 10 specific PDCCH/PDSCH with wireless device-specific DMRS(s).

If the wireless device 10 has selected a beam from a primary cell, the radio network node 12 can configure a beam recovery response to be transmitted using a common RS which can be cell specific and/or cell and beam specific RS. If the wireless device 10 has selected a beam from the primary cell, in that case, it also expects a response transmitted in the wireless device 10 specific PDCCH/PDSCH with the common RS.

If the wireless device 10 has selected a beam from a configured neighbor cell, the radio network node 12 can configure a beam recovery response to be transmitted using a previously configured wireless device-specific DRMS over a previously configured PDCCH/PDSCH for the detected wireless device 10. If the wireless device 10 has selected a beam from a primary cell, in that case, it also expects a response transmitted in the wireless device specific PDCCH/PDSCH with wireless device-specific DMRS(s).

If the wireless device 10 has selected a beam from a configured neighbor cell, the radio network node may configure a beam recovery response to be transmitted using a common RS which can be cell specific and/or cell and beam specific RS. If the wireless device 10 has selected a beam from a primary cell, in that case, it also expects a response transmitted in the wireless device specific PDCCH/PDSCH with the common RS.

Actions by the wireless device 10 after selecting a beam from the primary cell and/or from a neighbor cell(s). If the wireless device 10 is configured with beam recovery parameters associated to multiple cells, the wireless device 10 can elect one or multiple beams. This one or multiple beams can be all from the primary cell or from any configured neighbor cells or from a combination of primary cell and neighbor cells.

Upon the beam selection, the wireless device 10 may send one or multiple beam recovery requests in one or a combination of the different manners described below:

In one alternative, the wireless device 10 selects one beam from one of the configured cells (i.e. primary cell or neighbor cells) and sends one request associated to one selected beam and monitors one or multiple responses.

In another alternative, the wireless device 10 selects multiple beams from one of the configured cells (i.e. primary cell or neighbor cells) and sends multiple requests associated to the selected beams and monitors one or multiple responses.

In another alternative, the wireless device 10 selects multiple beams where these may be associated to different configured cells (e.g. primary cell or neighbor cells) and sends multiple requests associated to the selected beams and monitors multiple responses.

In the monitoring process the wireless device 10 can receive one or multiple responses and select one of the responses according to configuration data. The responses may either contain cell-specific parameters (e.g. cell-specification reference signals to decode the message, which can be a media access control (MAC) control element (CE) and/or RRC and/or a L1 message), beam specific and/or wireless device-specific parameters (e.g. wireless device-specific DMRS).

In this case of multiple responses and if the wireless device 10 can select one cell and indicate that, the wireless device 10 may apply cell specific and/or wireless device-specific associated parameters e.g. cell radio network temporary identifier (C-RNTI).

Figure 5:
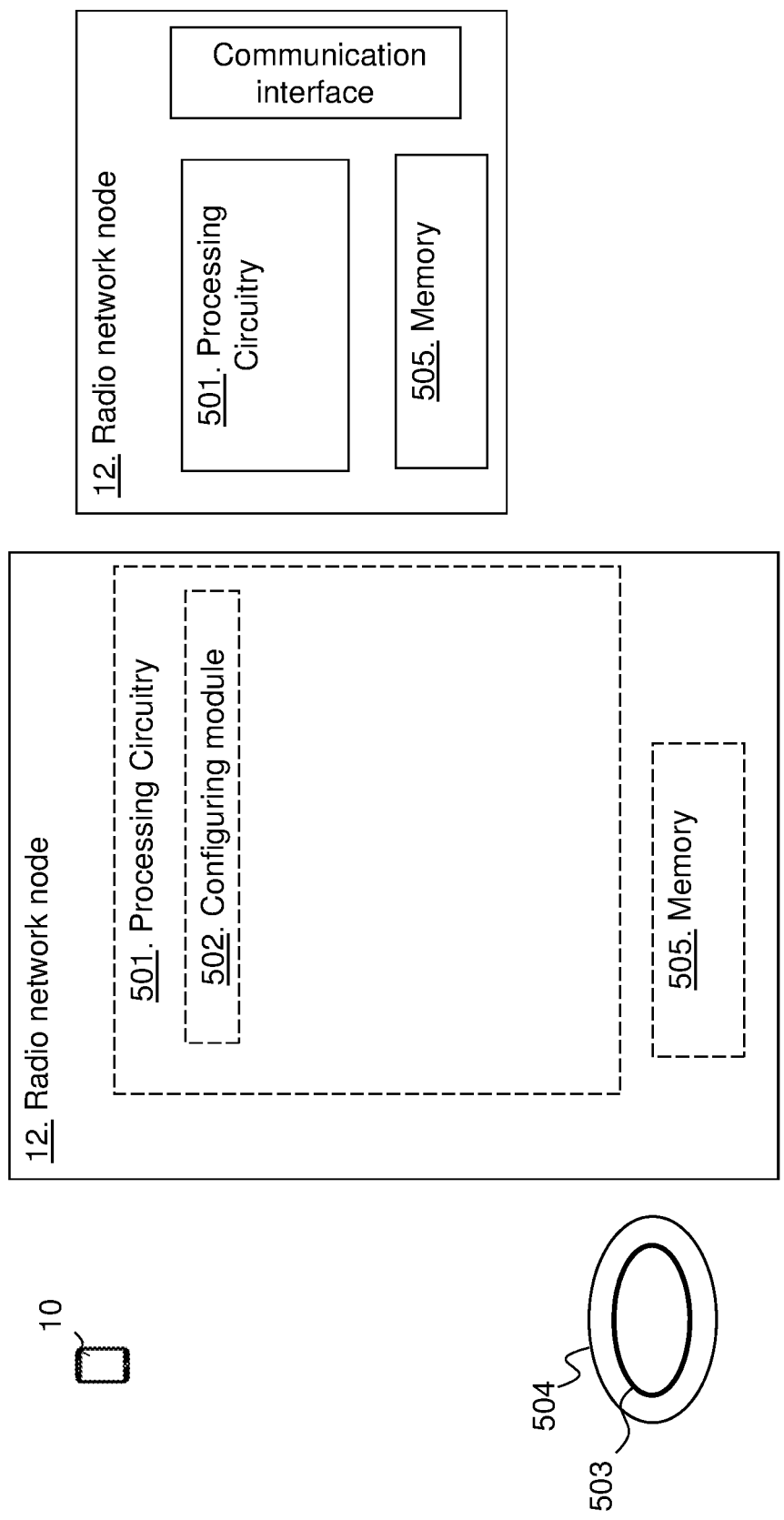
FIG. 5 is a block diagram depicting a radio network node according to embodiments herein.

FIG. 5 is a block diagram depicting the radio network node 12, in two embodiments, for handling communication of the wireless device 10 in the wireless communication network 1.

The radio network node 12 may comprise processing circuitry 501, e.g. one or more processors, configured to perform the methods herein.

The radio network node 12 may comprise a configuring module 502. The radio network node 13, the processing circuitry 501, and/or the configuring module 502 is configured to configure the wireless device 10 to perform a beam recovery process in one cell of a configured set of cells, wherein the configured set of cells includes a primary cell and a set of neighbor cells. The set of neighbor cells may be comprised in a list of cells of a same measurement object as the primary cell, or are any cells of the same measurement object as the primary cell. The radio network node 13, the processing circuitry 501, and/or the configuring module 502 may be configured to configure the wireless device 10 to perform the beam recovery process in one cell of the configured set of cells by transmitting a black list indicating cells where the wireless device is not allowed to perform beam recovery process. The radio network node 13, the processing circuitry 501, and/or the configuring module 502 may be configured to the wireless device 10 to perform the beam recovery process in one cell of the configured set of cells by transmitting reference signal configuration and/or uplink resource configuration per configured cell or for all cells in the set of cells. The radio network node 13, the processing circuitry 501, and/or the configuring module 502 may be configured to the wireless device 10 to perform the beam recovery process in one cell of the configured set of cells by transmitting a threshold per cell defining when to select a cell of the set of neighbor cells relative the primary cell.

The radio network node 13, and/or the processing circuitry 501 may be configured to detect that the wireless device 10 accesses a beam of a different cell not provided by the radio network node; and to fetch context of the wireless device 10.

The methods according to the embodiments described herein for the radio network node 12 are respectively implemented by means of e.g. a computer program product 503 or a computer program, comprising instructions, i.e., software code portions, which, when executed on at least one processor, cause the at least one processor to carry out the actions described herein, as performed by the radio network node 12. The computer program product 503 may be stored on a computer-readable storage medium 504, e.g. a disc, universal serial bus (USB) stick, or similar. The computer-readable storage medium 504, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 may further comprise a memory 505. The memory comprises one or more units to be used to store data on, such as configurations, measurements, serving cells, wireless device information, applications to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein. The radio network node 12 may further comprise a communication interface comprises a receiver, a transceiver, a transmitter and/or one or more antennas.

FIG. 6 is a block diagram depicting, in two embodiments, the wireless device 10 according to embodiments herein for handling communication of the wireless device 10 in the wireless communication network 1.

The wireless device 10 may comprise processing circuitry 601, e.g. one or more processors, configured to perform the methods herein.

The wireless device 10 may comprise a performing module 602. The wireless device 10, the processing circuitry 601, and/or the performing module 602 is configured to perform a beam recovery process of the selected beam upon beam failure detection, wherein the selected beam is associated to one cell of a configured set of cells, wherein the configured set of cells includes a primary cell and a set of neighbor cells.

The wireless device 10, the processing circuitry 601, and/or the performing module 602 may be configured to send a message associated with the selected beam by using an uplink resource configuration that belongs to the primary cell or any of the configured set of cells.

The wireless device 10, and/or the processing circuitry 601 may be configured to receive the configuring data from the radio network node 12 configuring the wireless device with the set of cells. The configuring data may comprise the black list indicating cells where the wireless device is not allowed to perform beam recovery process. The configuring data may comprise a reference signal configuration and/or uplink resource configuration per configured cell or for all cells in the set of cells. The configuring data may comprise a threshold per cell defining when to select a cell of the set of neighbor cells relative the primary cell.

The methods according to the embodiments described herein for the wireless device 10 are respectively implemented by means of e.g. a computer program product 603 or a computer program, comprising instructions, i.e., software code portions, which, when executed on at least one processor, cause the at least one processor to carry out the actions described herein, as performed by the wireless device 10. The computer program product 603 may be stored on a computer-readable storage medium 604, e.g. a disc, an USB stick, or similar. The computer-readable storage medium 604, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 may further comprise a memory 605. The memory comprises one or more units to be used to store data on, such as cell IDs, neighboring cells, RACH information, reference signal information, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein. The wireless device 10 may further comprise a communication interface comprises a receiver, a transceiver, a transmitter and/or one or more antennas.

As will be readily understood by those familiar with communications design, that function means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Any two or more embodiments described in this document may be combined in any way with each other.

In some embodiments a non-limiting term "wireless device" is used. The wireless device herein can be any type of wireless device capable of communicating with network node or another wireless device using radio signals. The wireless device may also be radio communication device, target device, device to device (D2D) wireless device, machine type wireless device or wireless device capable of machine to machine communication (M2M), a sensor equipped with wireless device, iPad, tablet, mobile terminal, smart phone, laptop embedded equipped (LEE), laptop mounted equipment (LME), USB dongles, Customer Premises Equipment (CPE) etc.

Also, in some embodiments generic terminology "network node", is used. It can be any kind of network node which may comprise of a radio network node such as base station, radio base station, base transceiver station, base station controller, network controller, evolved Node B (eNB), Node B, gNodeB (gNB), multi-RAT base station, Multi-cell/multicast Coordination Entity (MCE), relay node, access point, radio access point, Remote Radio Unit (RRU) Remote Radio Head (RRH), a core network node (e.g., Mobility Managing Entity (MME), Self-Organizing Network (SON) node, a coordinating node, positioning node, Minimizing Drive Test (MDT) node, etc.), or even an external node (e.g., 3$^{rd}$ party node, a node external to the current network), etc.

The term "radio node" used herein may be used to denote the wireless device or the radio network node.

The embodiments are applicable to single carrier as well as to multicarrier or carrier aggregation (CA) operation of the wireless device 10 in which the wireless device 10 is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling, e.g., via Radio Resource Control (RRC), lower-layer signaling, e.g., via a physical control channel or a broadcast channel, or a combination thereof. The signaling may be implicit or explicit. The signaling may further be unicast, multicast or broadcast. The signaling may also be directly to another node or via a third node.

The term radio resource used herein may correspond to any type of physical resource or radio resource expressed in terms of length of time and/or frequency.

Examples of time resources are: symbol, time slot, subframe, radio frame, Transmission Time Interval (TTI), interleaving time, System Frame Number (SFN), etc.

In some embodiments, the term "RS" is used, which most frequently refers to SSB or CSI-Rs but in principle may also refer to other RS types or physical signals. The embodiments described herein may apply to any RAT or their evolution, e.g., New Radio (NR), LTE Frequency Duplex Division (FDD), LTE Time Duplex Division (TDD), LTE with frame structure 3 or unlicensed operation, UTRA, GSM, WiFi, short-range communication RAT, narrow band RAT, RAT for 5G, etc.

Figure 7:
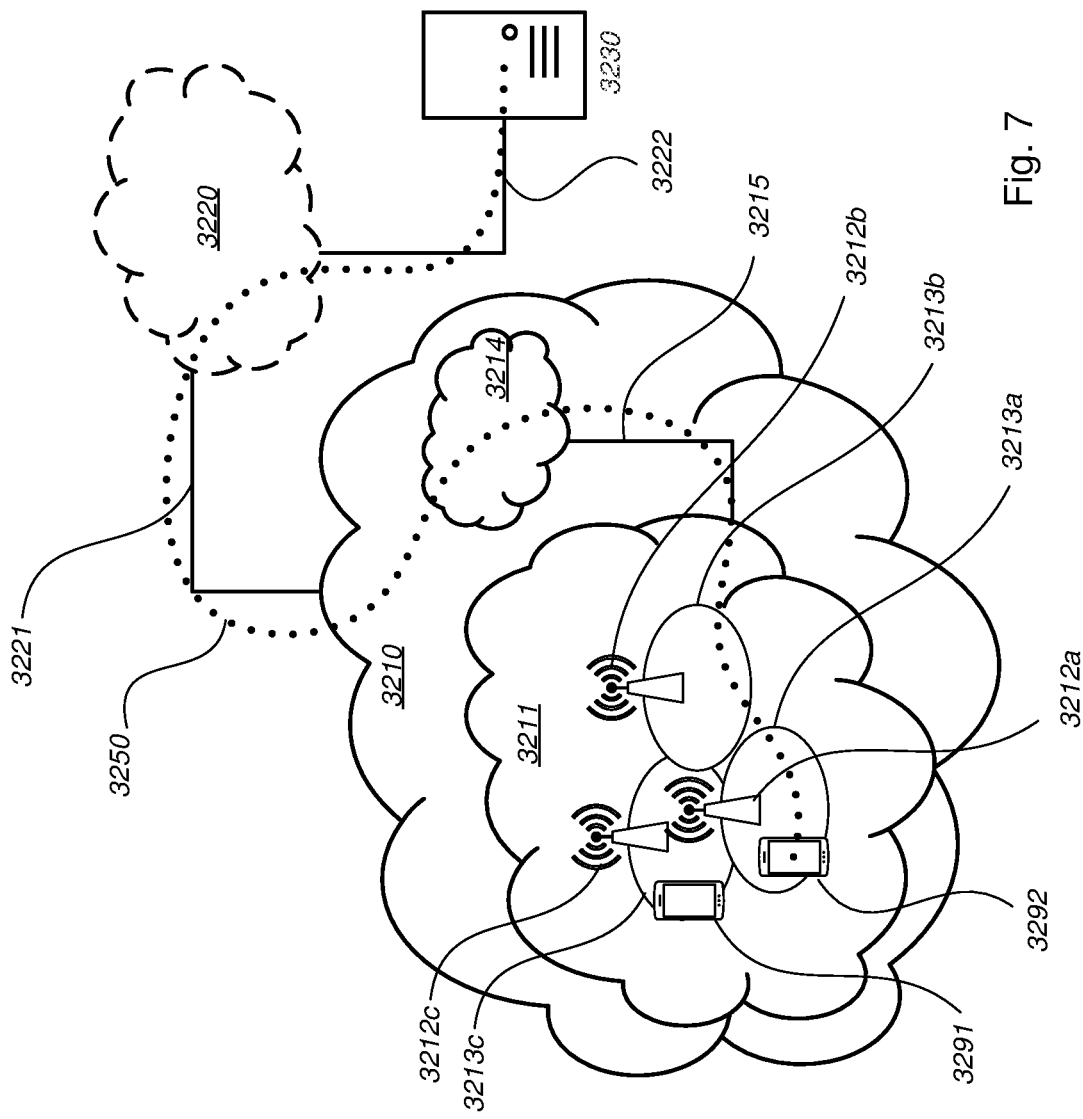
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries.

The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
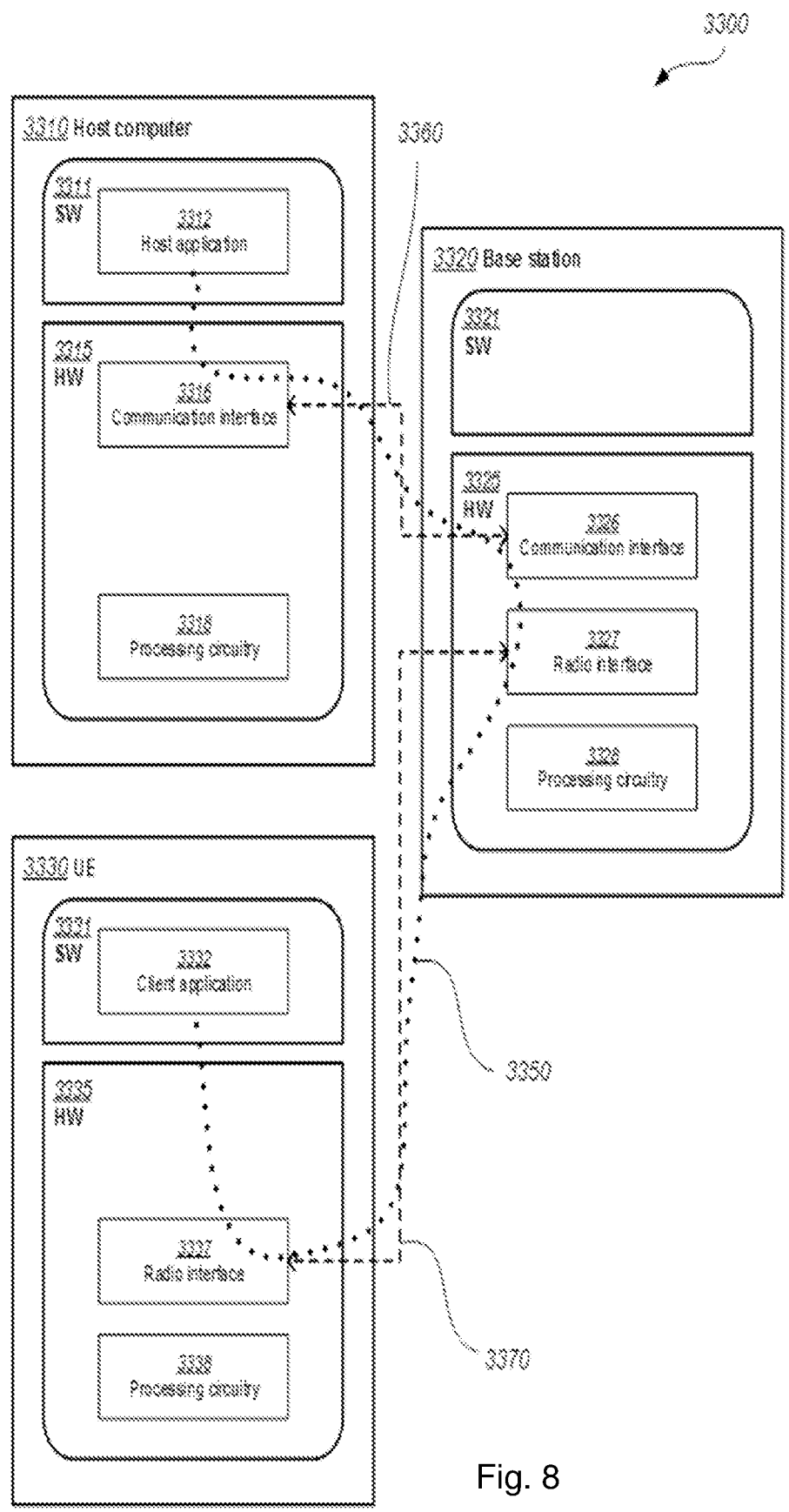
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the efficiency to use resources and/or beams that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
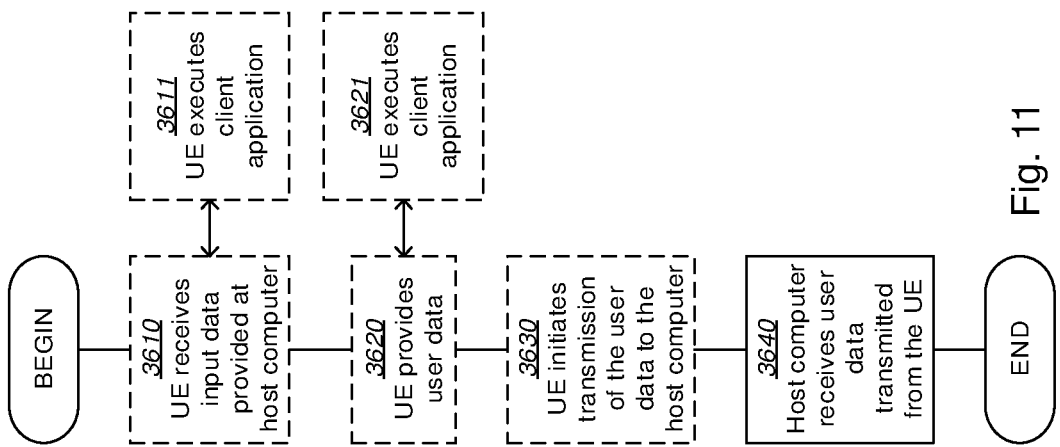

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
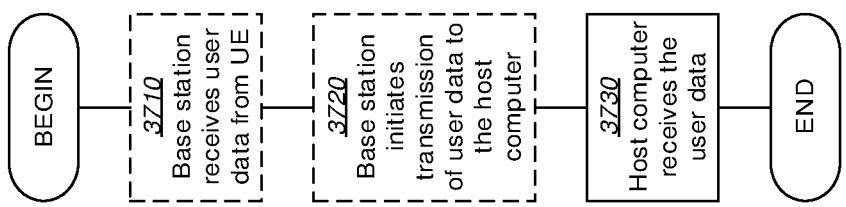

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a wireless communication network, the method comprising
    performing a beam recovery process of a selected beam upon beam failure detection, the selected beam being associated to one cell of a configured set of cells, the configured set of cells including a primary cell and a set of neighbor cells; and
    receiving configuring data from the radio network node configuring the wireless device with the set of cells, the configuring data comprising a black list indicating cells where the wireless device is not allowed to perform a beam recovery process and a relative threshold per cell defining when to select a cell of the set of neighbor cells relative to the primary cell.

2. The method according to claim 1, further comprising:
    sending a message associated with the selected beam using an uplink resource configuration that belongs to one of the primary cell and any of the configured set of cells.

3. The method according to claim 1, wherein the configuring data comprises at least one of a reference signal configuration and uplink resource configuration one of per configured cell and for all cells in the set of cells.

4. The method according to claim 1 wherein at least one of:
    the primary cell is one of a primary cell of a primary cell group and a primary secondary cell of a secondary cell group; and
    a neighbor cell in the set of neighbor cells is one of a non-serving cell and a serving cell that is a secondary cell.

5. A computer program product comprising a non-transitory computer readable medium storing computer program instructions, which, when executed on at least one processor, cause the at least one processor to perform a method according to claim 1, as performed by the radio network node or the wireless device respectively.

6. A method performed by a radio network node for handling communication of a wireless device in a wireless communication network, the method comprising:

configuring the wireless device to perform a beam recovery process in one cell of a configured set of cells, the configured set of cells including a primary cell and a set of neighbor cells and configuring the wireless device to perform the beam recovery process in one cell of the configured set of cells comprising transmitting a black list indicating cells where the wireless device is not allowed to perform beam recovery process and transmitting a relative threshold per cell defining when to select a cell of the set of neighbor cells relative to the primary cell.

7. The method according to claim 6, further comprising:
detecting that the wireless device accesses a beam of a different cell, which cell is not provided by the radio network node; and
fetching context of the wireless device.

8. The method according to claim 6, wherein the set of neighbor cells is one of comprised in a list of cells of a same measurement object as the primary cell and are any cells of the same measurement object as the primary cell.

9. The method according to claim 6, wherein configuring the wireless device to perform the beam recovery process in one cell of the configured set of cells comprises at least one of transmitting reference signal configuration and uplink resource configuration one of per configured cell and for all cells in the set of cells.

10. The method according to claim 6, wherein at least one of:
the primary cell is one of a primary cell of a primary cell group and a primary secondary cell of a secondary cell group; and
a neighbor cell in the set of neighbor cells is one of a non-serving cell and a serving cell that is a secondary cell.

11. A radio network node for handling communication of a wireless device in a wireless communication network, the radio network being configured to:
configure the wireless device to perform a beam recovery process in one cell of a configured set of cells, the configured set of cells including a primary cell and a set of neighbor cells;
configure the wireless device to perform the beam recovery process in one cell of the configured set of cells by transmitting a black list indicating cells where the wireless device is not allowed to perform beam recovery process; and
configure the wireless device to perform the beam recovery process in one cell of the configured set of cells by transmitting a relative threshold per cell defining when to select a cell of the set of neighbor cells relative to the primary cell.

12. The radio network node according to claim 11, wherein the radio network is further configured to:
detect that the wireless device accesses a beam of a different cell which cell is not provided by the radio network node; and
fetch context of the wireless device.

13. The radio network node according to claim 11, wherein the set of neighbor cells is one of comprised in a list of cells of a same measurement object as the primary cell, and are any cells of the same measurement object as the primary cell.

14. The radio network node according to claim 11, wherein the radio network node is configured to configure the wireless device to perform the beam recovery process in one cell of the configured set of cells by transmitting at least one of reference signal configuration and uplink resource configuration per configured cell or for all cells in the set of cells.

15. The radio network node according to claim 11, wherein at least one of:
the primary cell is a primary cell of a primary cell group or a primary secondary cell of a secondary cell group; and
a neighbor cell in the set of neighbor cells is one of a non-serving cell and a serving cell that is a secondary cell.

16. A wireless device for handling communication of the wireless device in a wireless communication network, the wireless device being configured to:
perform a beam recovery process of a selected beam upon beam failure detection, the selected beam is associated to one cell of a configured set of cells, the configured set of cells including a primary cell and a set of neighbor cells; and
receive configuring data comprising a black list indicating cells where the wireless device is not allowed to perform beam recovery process from the radio network node configuring the wireless device with the set of cells and a threshold per cell defining when to select a cell of the set of neighbor cells relative to the primary cell.

17. The wireless device according to claim 16, wherein the wireless device is configured to:
send a message associated with the selected beam by using an uplink resource configuration that belongs to the primary cell or any of the configured set of cells.

18. The wireless device according to claim 16, wherein the configuring data comprises at least one of a reference signal configuration and uplink resource configuration one of per configured cell and for all cells in the set of cells.

19. The wireless device according to claim 16, wherein at least one of:
the primary cell is one of a primary cell of a primary cell group and a primary secondary cell of a secondary cell group; and
a neighbor cell in the set of neighbor cells is one of a non-serving cell and a serving cell that is a secondary cell.

* * * * *